US005802692A

United States Patent [19]

Philippe

[11] Patent Number: 5,802,692

[45] Date of Patent: Sep. 8, 1998

[54] GLO-PLUG EXTRACTOR

[76] Inventor: Devin Philippe, P.O. Box 1185, Gonzales, La. 70707

[21] Appl. No.: 589,850

[22] Filed: Jan. 22, 1996

[51] Int. Cl.[6] .......... B23P 19/04

[52] U.S. Cl. .......... 29/263; 29/244; 29/265; 29/272; 29/280; 81/318; 81/53.12; 81/53.2

[58] Field of Search .......... 29/263, 244, 238, 29/258, 264, 272, 278, 280, 282, 265; 81/52.35, 3.8, 53.12–53.2

[56] References Cited

U.S. PATENT DOCUMENTS

| | | |
|---|---|---|
| 134,507 | 1/1873 | Baylis . |
| 155,429 | 9/1874 | Devine . |
| 538,571 | 2/1895 | Wilson . |
| 728,096 | 5/1903 | Giltner . |
| 2,900,169 | 8/1959 | White . |
| 3,529,497 | 9/1970 | Brooks . |
| 3,750,500 | 8/1973 | Peterson . |

*Primary Examiner*—James G. Smith
*Assistant Examiner*—Lee Wilson
*Attorney, Agent, or Firm*—Roy, Kiesel & Tucker, PLC

[57] ABSTRACT

A glo-plug extractor is disclosed. An internally threaded sleeve is threaded over an externally threaded bolt having a bolt head at one end and a set of jaws at the other. The jaws are fitted to lock onto the head of a fully unscrewed, yet bound glo-plug. After the jaws are locked onto the glo-plug, the sleeve is braced against the engine head either by screwing the sleeve down over the jaws until it contacts the engine head or by placing some bracing apparatus such as a spacer or a set of legs between the sleeve and the engine head. Once the sleeve is braced, it must be locked in place using a locking apparatus such as vice grips or a wrench. The bolt head is then used to rotate the bolt relative to the sleeve. This rotation causes the sleeve to exert a pulling force on the bound glo-plug which either extracts the glo-plug whole or breaks it.

4 Claims, 4 Drawing Sheets

FIGURE 5 (NOT CLAIMED)

GLO-PLUG EXTRACTOR

BACKGROUND OF THE INVENTION

In many smaller diesel engines, such as those found in many pick-up type trucks, nozzles inject fuel into a pre-combustion chamber located in the engine head. Before starting the engine when it is cold, the air in this pre-chamber must be heated to ensure proper combustion of the fuel. Failure to heat the pre-chamber sufficiently can severely inhibit or prevent ignition. One method of heating the pre-chamber involves the use of glo-plugs.

A typical glo-plug consists of a central conductor which terminates in a heater coil element packed in magnesium oxide or a similar substance, all of which is surrounded by a metal sheath. The upper portion of the sheath is generally encased in a threaded metal shell which has a hex head for engaging a wrench. The central conductor usually extends slightly from the hex head. To this end of the central conductor, an electrical terminal blade is attached.

Glo-plug holes, one for each cylinder, are provided in the engine head. These holes have an upper threaded portion which corresponds in diameter to the shell portion of the glo-plug. The holes also have a lower unthreaded portion which corresponds in diameter to the exposed portion of the sheath. The tolerance between the sheath and the lower portion of the hole is low, so that any deformity in the sheath would impede its insertion or inhibit its removal. The glo-plug is screwed into these threaded holes, so that the lower exposed portion of the sheath extends into the pre-chamber. The terminal blade is then connected to the automobile's electrical system which provides current to the glo-plug. When current is passed through the central conductor and heater coil element, the heater coil element gives off heat and warms the pre-chamber.

Over time, and with repeated usage, the magnesium oxide or other pack material will break down. As it breaks down, it will expand, often causing the sheath to become deformed. These deformities often take the form of bubbles or knots that form in the outer surface of the sheath.

Eventually, the glo-plug will need to be replaced, either because it has ceased to function or as part of a periodic maintenance regimen for the automobile. General Motors Corp., recommends changing glo-plugs once every 12,000 miles. Ideally, replacement is a fairly simple process. The electrical terminal blade is disconnected from the electrical system. The blade may be removed—broken off, a process which can be accomplished in a matter of seconds with a pair of pliers. With the blade removed, the glo-plug can be backed out of the threaded hole with a standard socket wrench. Glo-plug sockets are available which fit the glo-plugs with the blade still attached.

After the threaded portion of the glo-plug has been fully unscrewed, the exposed portion of the sheath will still be in the lower portion of the glo-plug hole. If the sheath is not deformed, the glo-plug may be withdrawn either using a pair of pliers or even by hand. In this case, removing an old glo-plug and replacing it with a new one will take only a few minutes.

However, if the sheath has a deformity, such as the knots or bubbles discussed above, the job will take much longer. If such a deformity exists, the sheath will bind in the tight confines of thus lower portion of the glo-plug hole, making withdrawal difficult or even impossible.

When a mechanic encounters a bound glo-plug, he will attempt to extract it by pulling on it with a pair of pliers or preferably, vice grips. Failing that, he will break the plug, leaving a portion of the sheath in the lower portion of the glo-plug hole. Because of the proximity of other parts surrounding many glo-plugs, the mechanic often experiences great difficulty gripping the glo-plug in a manner that allows him to get adequate leverage either to extract the plug or to break it. Consequently, this job of extracting or breaking a single bound plug can often take as much as forty-five minutes to an hour. For the same reason, removing bound glo-pugs can be a source of substantial frustration for the diesel mechanic.

In the event that the sheath breaks, a portion of the sheath will remain lodged in the lower portion of the glo-plug hole. To remove the fragment that remains, the mechanic must use a nail punch or other similar device to drive the fragment back into the pre-chamber. To remove the fragment from the pre-chamber, the mechanic must remove the nozzle so that he can access the interior of the pre-chamber. Removing and replacing a nozzle will take a skilled mechanic about fifteen minutes.

In addition to this delay, there is another reason why a mechanic wishes to avoid breaking glo-plugs. When the fragment is driven back into the pre-chamber, there is a chance that the fragment will fall into the cylinder. In order to remove the fragment from the cylinder, the engine head must be removed. This is a job that requires hours, and sometimes days. Failure to remove the fragment from the cylinder can result in serious damage to the piston, the engine head, or even the block which could necessitate replacing the entire engine.

Changing the glo-plugs in a typical eight cylinder diesel engine in which as few as three of the glo-plugs are deformed can be extremely time consuming. Replacing the five non-deformed glo-plugs will take around forty-five minutes. Extracting or breaking the three bound plugs will conservatively take ninety minutes. If two of them break, removing the nozzles to extract the fragment will require another thirty minutes. Assuming neither fragment falls into the cylinder, the total approximate time required for this job is about two hours and fifteen minutes. If the mechanic charges fifty dollars an hour, the labor for the job will cost one hundred and twelve dollars and fifty cents.

Therefore, an invention meeting the following objectives is desired.

OBJECTS OF THE INVENTION

It is an object of this invention to provide a tool for extracting glo-plugs lodged in a diesel engine head.

It is another object of this invention to provide a tool for quickly breaking glo-plugs lodged in a diesel engine head when such glo-plugs cannot be extracted.

It is another object of this invention to reduce the time required to change the glo-plugs in a diesel engine.

It is yet another object of the invention to provide a tool capable of performing in the limited spaces surrounding many diesel engines.

SUMMARY OF THE INVENTION

The invention is a glo-plug extractor comprising an externally threaded bolt having a bolt head at one end. By way of example, this bolt head could be hexed shaped for engaging a wrench, or recessed for engaging an allen wrench or slotted for engaging a screwdriver or drill. At the opposite end of the bolt are a set of jaws. These jaws are formed to grip the head of a glo-plug.

An internally threaded sleeve fits over the externally threaded bolt so that the threads of the sleeve engage those of the bolt. The sleeve should have an internal diameter that is wider than the jaws when they are closed. The exterior of the sleeve may be hexed for engaging a wrench.

To remove or break a lodged glo-plug, one should first engage the head of the glo-plug with the jaws. The next step is to create a surface for pulling against the engine head. This can be accomplished by positioning the sleeve over the jaws so that the sleeve is adjacent to the engine head. Alternatively, this can be accomplished by placing something such as a spacer or legs between the end of the sleeve and the engine head. The sleeve must also be held in a stationary position with a pair of vice grips or a wrench or other gripping device. When the sleeve is braced against the engine head and locked in place, the bolt may be rotated with respect to the sleeve. This rotation will cause the jaws to be drawn toward the sleeve, which will extract or break the glo-plug.

While some bound glo-plugs will still need to be broken to be removed, a mechanic using the extractor will extract glo-plugs intact which otherwise would have to have been broken to be removed. Whether a bound glo-plug has to be broken or not, a mechanic can either extract or break the glo-plug in as little as three to five minutes, substantially reducing the time required to change the glo-plugs.

DESCRIPTION OF THE FIGURES

FIG. 5 depicts a glo-plug.

DETAILED DESCRIPTION OF THE INVENTION

Figures 1, 2, 8:
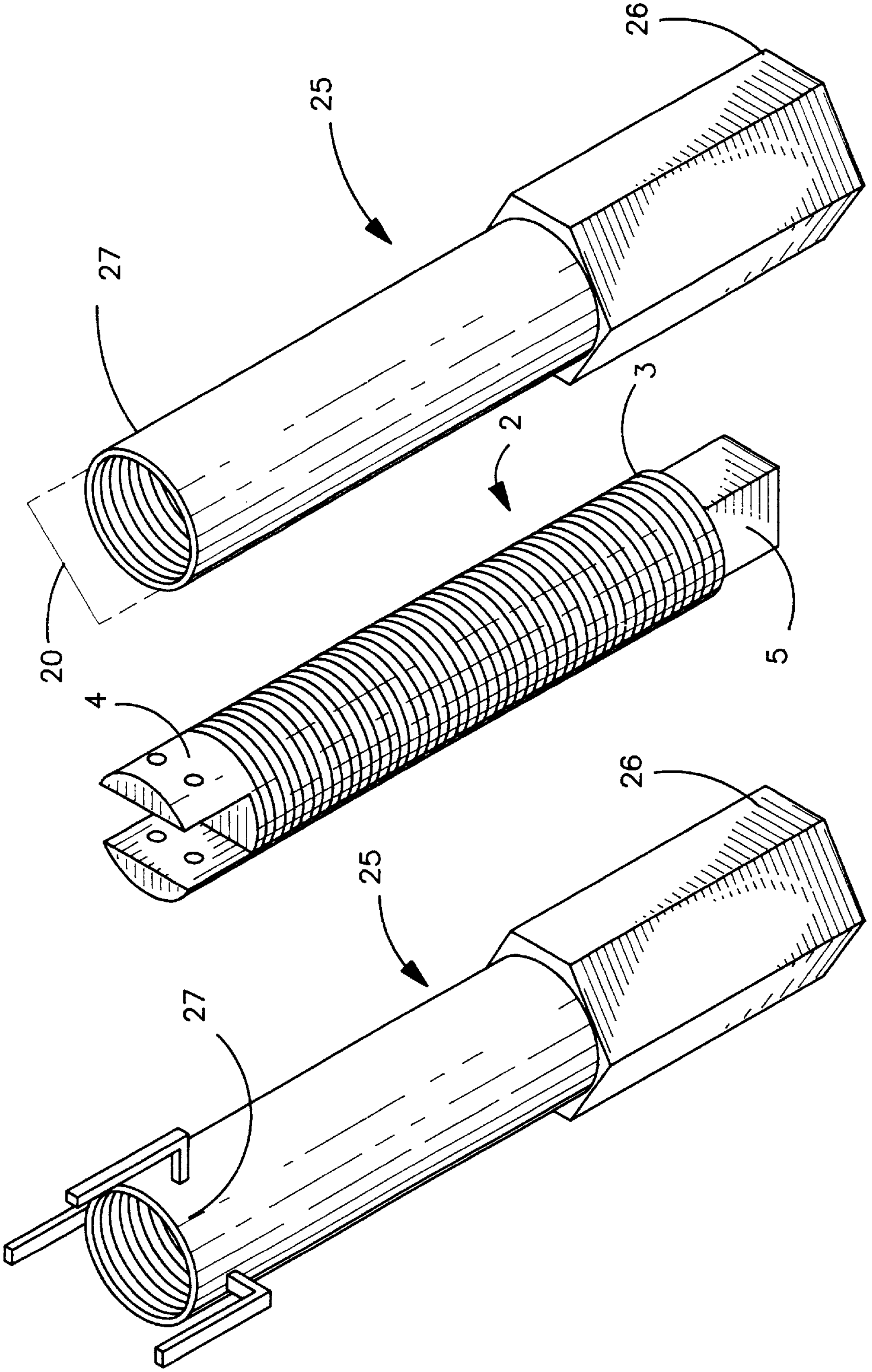
FIG. 1 depicts a preferred embodiment of the externally threaded bolt.
FIG. 2 depicts a preferred embodiment of the internally threaded sleeve.
FIG. 8 depicts a preferred embodiment of the internally threaded sleeve having a plurality of legs mounted to the jaw end of the sleeve.
Figure 6:
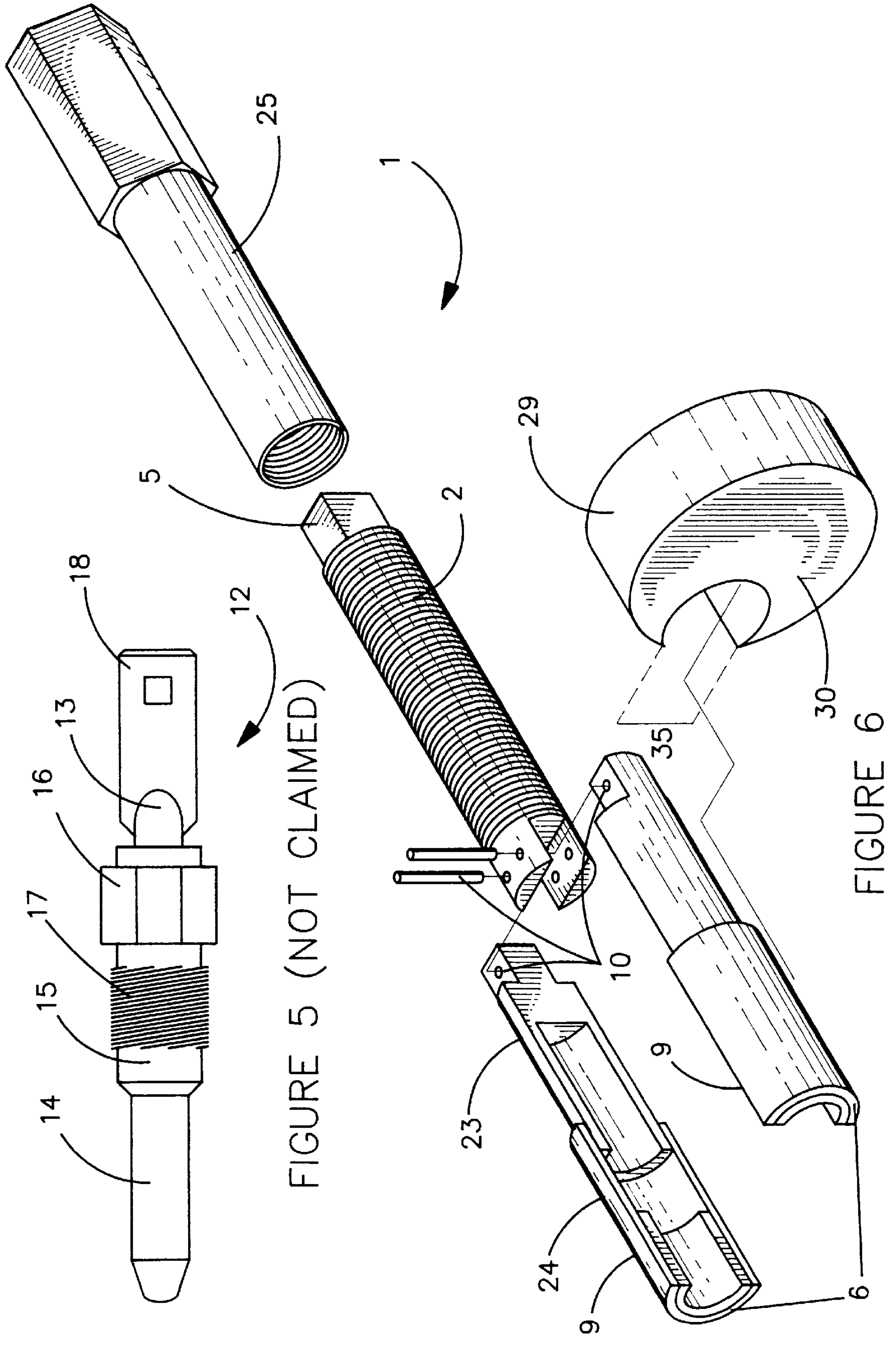
FIG. 6 is an exploded view of a preferred embodiment of the extractor.

A glo-plug extractor 1 is disclosed. Referring to FIGS. 1 and 6, glo-plug extractor 1 comprises an externally threaded bolt 2 having a first end 3 and a second end 4. A bolt head 5 is attached to first end 3. Bolt head 5 may be hex shaped to engage a wrench or recessed to engage an allen wrench. It may be slotted to engage a screwdriver or grooved to engage a pair of pliers or vice grips. Bolt head 5 may be provided with handles so that it may be turned by hand. The shape of bolt head 5 may be varied to engage the driving mechanism of any power tool such as an air wrench or drill.

Figure 3:
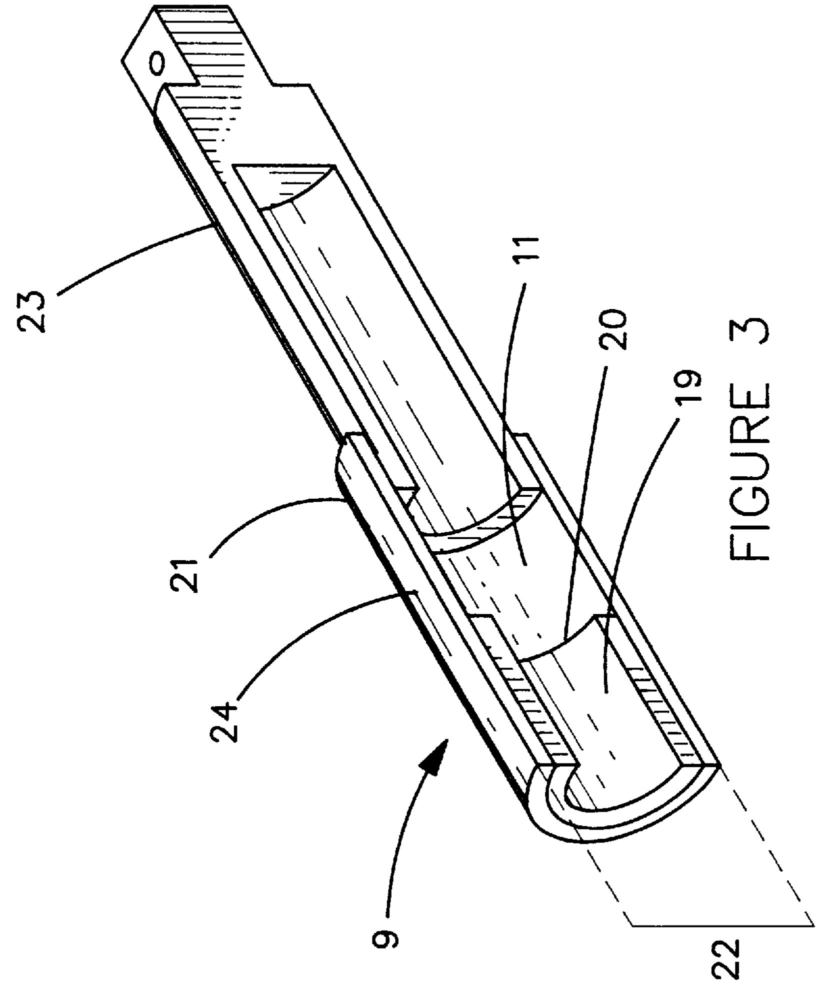
FIG. 3 depicts a preferred embodiment of a jaw member.

Referring to FIGS. 3 and 6, a set of jaws 6 are attached to second end 4. Jaws 6 have an open position and a closed position. Jaws 6 may comprise two or more jaw members 9. Jaws 6 should be attached to second end 4 to allow for movement between open position and closed position. In one preferred embodiment, jaws 6 are attached to second end 4 by hinges 10. Hinges 10 are intended to include attachments that comprise nibs or pins that extend from jaws 6 and engage slots or indentations in second end 4, as well as any other swivel type attachment. All jaw members 9 need not be hinged in this embodiment. Instead, one or more jaw members 9 may remain fixed, allowing the remaining jaw member(s) to open. In another preferred embodiment one or more of jaw members 9 are removable. In another preferred embodiment jaws 6 are flexibly attached to second end 4 with materials such as rubber or plastic or resilient metal.

Referring to FIGS. 3, 5 and 6, jaws 6 have an inner gripping surface 11 which is shaped to engage a glo-plug 12. Glo-plugs 12 generally comprise a center terminal conductor 13 which is covered by a sheath 14. An externally threaded shell 15 having an upper portion 16 and a threaded portion 17 fits over sheath 14. Upper portion 16 of shell 15 is usually larger in diameter than the rest of shell 15 and hex shaped. Center terminal conductor 13 generally extends slightly beyond upper portion 16 of shell 15. An electrical terminal blade 18 frequently is attached to center terminal conductor 13.

Inner gripping surface 11 is shaped to engage upper portion 16. Each jaw member 9 has lip 19 extending inwardly and substantially perpendicularly to the longitudinal axis of each jaw member 9. When jaws 6 are in closed position 8 lips 19 create a lip ring 20. The diameter of lip ring 20 is less than the diameter of upper portion 16. Lip ring 20 need not be continuous. In fact, only two points on lip ring 20 are required.

Lip ring 20 should be positioned within interior gripping surface 11 to engage a fully unscrewed glo-plug 12 between the threaded portion 17 and upper portion 16. Lip ring 20 may then exert a pulling force on upper portion 16.

Inner gripping surface 11 may be sized to contain electrical terminal blade 18. Alternatively, the mechanic may remove electrical terminal blade 18 with a pair of pliers.

In a preferred embodiment, several sets of jaws 6 may be provided to fit glo-plugs 12 of varying diameters. In this embodiment, jaws 6 should be attached to second end 4 in a manner that is conducive to interchanging the various sets of jaws 6 such as by using removable hinges to attach jaws 6.

Jaws 6 have an outer surface 21. In closed position 8, outer surface 21 has an outer surface diameter 22. Depending upon the shape of outer surface 21 outer surface diameter 22 may be wider at some points than at others. If this variance does exist, some portion of outer surface 21 will necessarily be the widest portion of outer surface diameter 22.

In one preferred embodiment each jaw member 9 comprises a first portion 23 and a second portion 24. First portion 23 is attached to second end 4 of bolt 2. Second portion 24 extends linearly from first portion 23. When jaws 6 are in closed position 8, outer surface diameter 22 of first portion 23 is less than outer surface diameter 22 of second portion 24.

Referring to FIGS. 1, 2 and 6, an internally threaded sleeve 25 having a bolt head end 26 and a jaw end 27 is positioned over and is in functional connection with externally threaded bolt 2. The threading on bolt 2 may extend the entire length of bolt 2. However, the threading must only be so long as the length of the exposed portion of sheath 14. This will vary depending on the specific glo-plug, but one to two inches of threading will be sufficient in most cases. The threading on sleeve 25 should correspond to that on bolt 2.

Sleeve 25 has an internal sleeve diameter 28. Internal sleeve diameter 28 is greater than the widest portion of outer surface diameter 22. In a preferred embodiment, the exterior of sleeve 25 is grooved to better engage a pair of pliers or vice grips. In another preferred embodiment, the exterior of sleeve 25 is hex shaped to engage a wrench.

Figure 4:
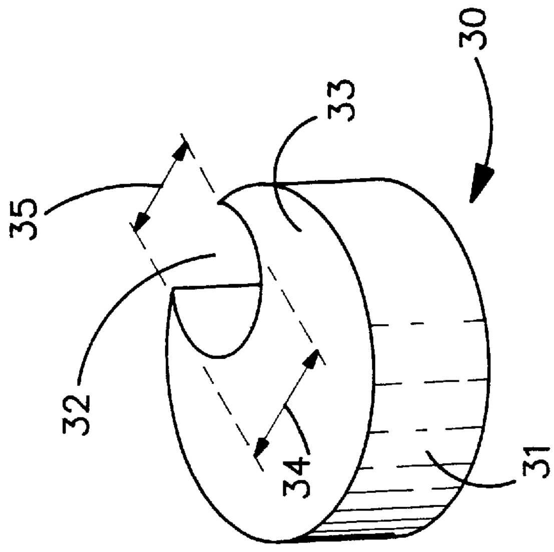
FIG. 4 depicts a preferred embodiment of the spacer.
Figure 7:
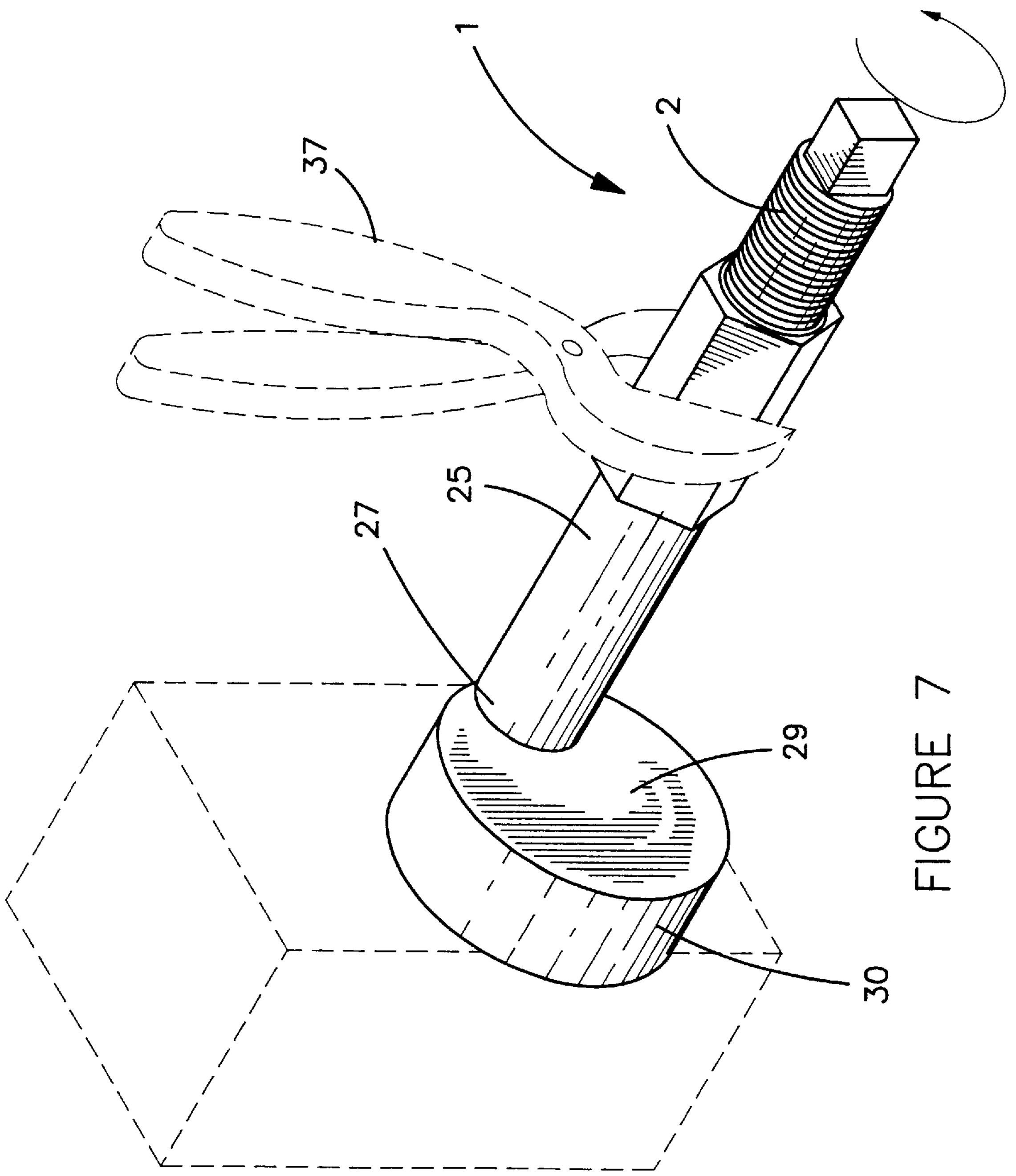
FIG. 7 depicts a preferred embodiment of the extractor in use.

Referring to FIGS. 4, 6 and 7, for extractor 1 to function, sleeve 25 must be braced against either the engine head or some other solid structure proximate to the lodged glo-plug 12. This is accomplished through bracing means 29. In one preferred embodiment, bracing means 29 is jaw end 27 of sleeve 25. In this embodiment, after jaws 6 have engaged lodged glo-plug 12, sleeve 25 is screwed down until it is positioned over jaws 6 and jaw end 27 is adjacent to the engine head.

In another preferred embodiment, bracing means 29 is a spacer 30 having spacer edges 31. Spacer 30 contains a channel 32 which runs completely through spacer 30. Channel 32 has channel sides 33 and a channel diameter 34. Channel diameter 34 should be wider than the widest portion of outer surface diameter 22 of jaws 6 in closed position, but should be narrow enough to prevent sleeve 25 from being inserted into channel 32.

Channel 32 is positioned within spacer 30 so that a portion of channel sides 33 spanning the full length of channel 32 coincide with spacer edges 31. This creates a channel opening 35.

Using channel opening 35, spacer 30 may be placed over jaws 6 after they have engaged lodged glo-plug 12. Spacer 30 rests on the engine head and sleeve 25 is screwed down until jaw end 27 is adjacent spacer 30.

In another preferred embodiment, spacer 30 is used in combination with the preferred embodiment wherein each jaw member 9 comprises first portion 23 and second portion 24. Channel 32 is cylindrical and channel diameter 34 is wider than the widest portion of the outer surface diameter 22 of second portion 24 of jaws 6 in closed position. Channel opening 35 is wider than the widest portion of the outer surface diameter 22 of first portion 23 of jaws 6 in closed position, but narrower than the outer surface diameter 22 of second portion 24 of jaws 6 in closed position. In this embodiment, it is preferrable that spacer edge 31 which is aligned with channel sides 33 to form channel opening 35 be either flat or concave with respect to channel 32.

In this preferred embodiment, when measured on a line from the center of glo-plug 12 through channel opening 32, outer surface 21 of jaws 6 will be the furthest part of extractor 1 from glo-plug 12. Therefore, there will be no part of extractor 1 beyond a line tangent to channel 32. This will allow extractor 1 to be used in areas where space is a concern. For example, the exhaust manifold in a Chevrolet 6.2 or 6.5 liter diesel engine is 5/16 of an inch from the center of one of the glo-plugs 12. Glo-plug 12 has a radius of 3/16 of an inch, leaving only 1/8 of an inch for jaws 6 to fit between glo-plug 12 and the manifold. This leaves little room for bracing means 29. By using this preferred embodiment of bracing means 29, all of spacer 30 can extend away from the manifold or other constrictive element. In one preferred embodiment, this space saving result can be achieved without spacer 30 by incorporating channel opening 35 into jaw end 27 of sleeve 25.

In another preferred embodiment, bracing means 29 comprises a plurality of legs mounted to jaw end 27 of sleeve 25. In this embodiment, jaws 6 are positioned so that they are level with the bottom of legs when jaws 6 are attached to glo-plug 12. Legs brace extractor 1 against the engine head.

For extractor 1 to function, sleeve 25 must be locked in place to allow bolt 2 to rotate relative to it. This is accomplished by locking means 37. Locking means 37 may be a wrench, a pair of pliers, vice grips, a clamp or any other similar device.

In a preferred embodiment, extractor 1 should be constructed of a strong material such as steel or stainless steel.

Referring to FIGS. 6 and 7, in operation extractor 1 is used by locking jaws 6 over glo-plug 12 so that lip ring 20 engages upper portion 16 of glo-plug 12. Bracing means 29 are positioned to brace jaw end 27 of sleeve 25 against the engine head. Sleeve 25 is then locked in place by locking means 37. Bolt 2 is then rotated with respect to sleeve 25 using bolt head 5. Alternatively, bolt head 5 could be used to hold bolt 2 stationary and locking means 37 could be used to rotate sleeve 25 with respect to bolt 2. In either event, the rotation will cause jaws 6 to move toward sleeve 25 which will result in a pulling force being exerted on glo-plug 12. Glo-plug 12 will then be either extracted intact or broken.

There are, of course, many alternate embodiments which should be obvious to one skilled in the art and are intended to be included within the scope of the following claims.

I claim:

1. A glo-plug extractor, for use in combination with a locking means, for exerting a pulling force on a glo-plug in a diesel engine head comprising:

- an externally threaded bolt, said bolt having a first end and a second end;
- a bolt head integrally connected to said first end of said bolt;
- a set of jaws attached to said second end of said bolt, said jaws having an open position and a closed position, said jaws having an inner gripping surface and an outer surface, said jaws in said closed position having an outer surface diameter;
- an internally threaded sleeve having a bolt head end and a jaw end, said sleeve being positioned over and in functional connection with said externally threaded bolt, said sleeve having an internal sleeve diameter, said internal sleeve diameter being greater than the widest portion of said outer surface diameter of said jaws in said closed position; and
- a bracing means for bracing said extractor against the engine head, whereby said bolt and said jaws are linearly drawn toward said jaw end of said sleeve when said sleeve is locked in place by the locking means and said bolt is rotated relative to said sleeve.

2. A glo-plug extractor according to claim 1 wherein said jaws further comprise a first portion and a second portion, said first portion being in connection with said bolt, said second portion extending linearly from said first portion, said outer surface of said second portion having a greater surface diameter than said outer surface of said first portion.

3. A glo-plug extractor according to claim 2 wherein said bracing means comprises a spacer having spacer edges, said spacer having a channel passing through it, said channel having channel sides, said channel having a channel diameter greater than the widest portion of said outer surface diameter of said jaws in said closed position, said channel diameter being small enough to prevent said sleeve from being inserted into said channel, said channel being positioned within said spacer to align a portion of said channel sides spanning the full length of said channel with said spacer edges to form a channel opening in said channel sides, said channel opening being wider than said outer surface diameter of said first portion of said jaws, said channel opening being narrower than said outer surface diameter of said second portion of said jaws.

4. A glo-plug extractor according to claim 1 wherein said bracing means comprises a plurality of legs extending from said sleeve.

* * * * *